UNITED STATES PATENT OFFICE.

SHOSUKE TAMARI, OF TOKYO, JAPAN.

LUTING COMPOSITION AND METHOD OF PRODUCING THE SAME.

1,281,702.

Specification of Letters Patent. Patented Oct. 15, 1918.

No Drawing. Application filed January 19, 1917. Serial No. 143,274.

*To all whom it may concern:*

Be it known that I, SHOSUKE TAMARI, residing at No. 12 Nagaoka-Cho, Honjo-Ku, city of Tokyo, Empire of Japan, have invented certain new and useful Improvements in Luting Compositions and Methods of Producing the Same, of which the following is the specification.

An important object of this invention is to obtain acid-proof vessels by coating them with the luting manufactured according to this invention.

I melt about 1 part of powdered sulfur by heating and add thereto by degrees about 3 parts of graphite and a few parts of asbestos, continuing to heat the mixture and stirring it. The mixture is then allowed to cool after it has been heated to a temperature not lower than about 170° C. and has become sticky.

The luting thus manufactured is first melted by subjecting it to a heat of about 170° C., and is then applied to the inside of a box or tub to any desired thickness. The coating thus applied is then pressed with a hot iron so that it adheres well to the vessel to which it is applied. (If a suitable quantity of paraffin is added to the luting when it is melted, the work of applying it to vessels is much facilitated.) The luting applied as described above never peels off, and vessels coated with it resist acid. If it is applied to vessels made of reinforced concrete, strong vessels well adapted for transporting acids will be obtained; and thus we shall be able to attain the object of preserving or transporting acids without using expensive lead plate. This invention is therefore one most needed at the present time.

Having now fully described my invention and the manner of carrying the same into effect, what I claim as new and desire to secure by Letters Patent, is—

1. A process of manufacturing an acid-proof luting consisting in mixing about 1 part of molten sulfur with about 3 parts of graphite, stirring the molten mass and in cooling the mixture after heating it to a temperature of approximately 170 degrees C., for the purpose set forth.

2. A luting consisting principally of sulfur and graphite in the ratio of one part of sulfur to three parts of graphite.

In testimony whereof I affix my signature in presence of two witnesses.

SHOSUKE TAMARI. [L. S.]

Witnesses:
K. SUGITA,
GENJI KURIBARA.